G. V. DE PEEL.
DRAFT APPLIANCE FOR AUTOMOBILES.
APPLICATION FILED MAR. 18, 1912.
1,054,831.
Patented Mar. 4, 1913.
2 SHEETS—SHEET 2.
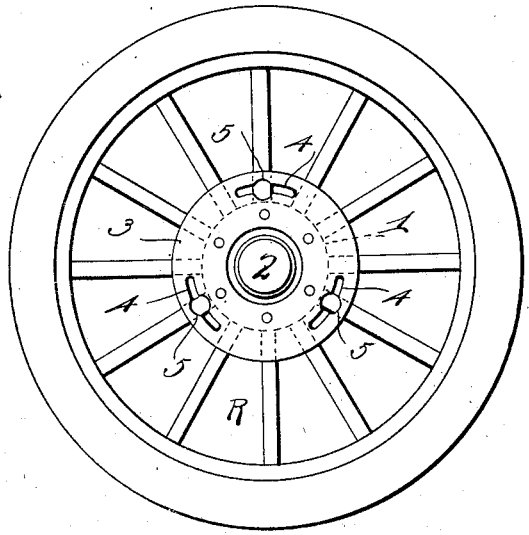
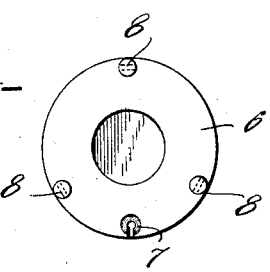
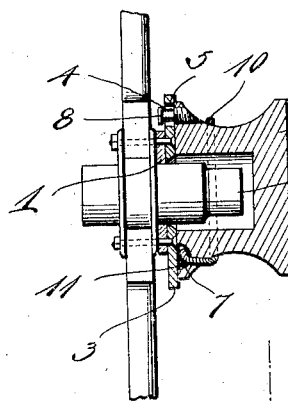
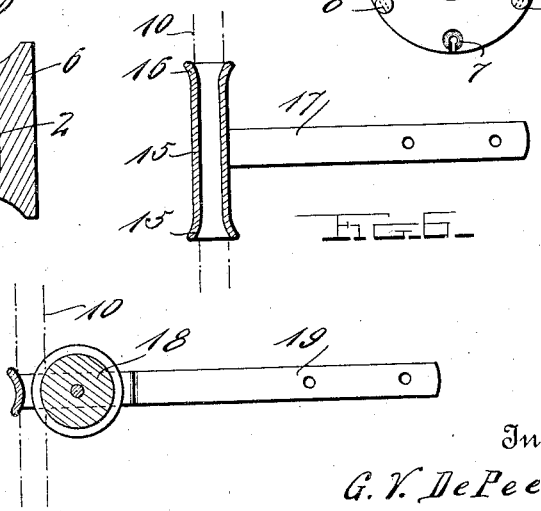
Witnesses
J. R. Pierce
N. L. Collamer
Inventor
G. V. De Peel
by H. B. Willson & Co.
Attorneys

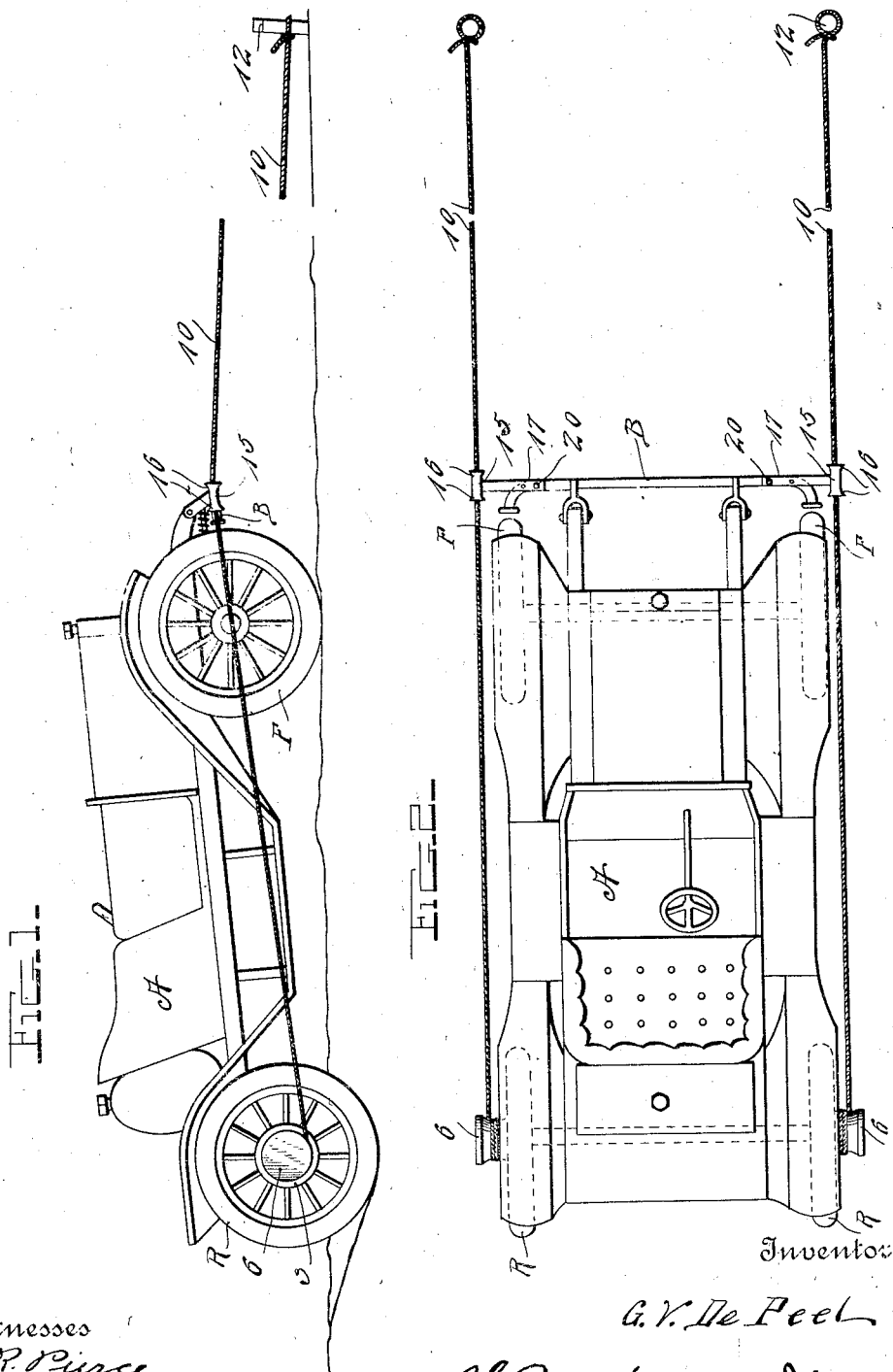

UNITED STATES PATENT OFFICE.

GAY VICTOR DE PEEL, OF CROCKER, SOUTH DAKOTA.

DRAFT APPLIANCE FOR AUTOMOBILES.

1,054,831.      Specification of Letters Patent.      Patented Mar. 4, 1913.

Application filed March 18, 1912. Serial No. 684,429.

*To all whom it may concern:*

Be it known that I, GAY VICTOR DE PEEL, a citizen of the United States, residing at Crocker, in the county of Clark and State of South Dakota, have invented certain new and useful Improvements in Draft Appliances for Automobiles; and I do declare the following to be a full, clear, and exact description of the invention, such as will enable others skilled in the art to which it appertains to make and use the same.

This invention relates to motor vehicles, and more especially to starters; and the object of the same is to produce an improved draft appliance, for attachment more particularly to motor vehicles whereby the same may be started when they are stuck in the mud or snow. This object is accomplished by means of an improved attachment hereinafter more fully described and claimed, and as shown in the drawings wherein—

Figure 1 is a side elevation and Fig. 2 a plan view showing this invention in use. Fig. 3 is an enlarged side elevation of one of the rear wheels with the disk attached thereto. Fig. 4 is an inner end elevation of a windlass or spool. Fig. 5 is a central vertical section showing said spool as attached to the disk. Fig. 6 is an enlarged plan view, partly in section, illustrating one form of the friction guide; and Fig. 7 is a similar view illustrating another form, the rope being indicated in both these views as somewhat larger than the opening through the guide.

In Fig. 1 of the drawings is shown an automobile A having a bumper rod B forward of its front wheels F; the machine in the present case having power-driven rear wheels R as usual. It is well known that automobiles occasionally become stuck in the mud or snow, and the driver finds considerable difficulty in getting started although after the machine is once started it runs with ease. The present invention is designed to be employed on occasions of this kind, and consists of a rope leading from a suitable anchor or stake driven in the roadway through a tension or friction guide carried at one extremity of the bumper rod to a windlass or spool detachably mounted on the hub of the rear wheel. As most automobiles have differential mechanism between their two rear wheels so that one could spin in the mud or snow while the other stood still, my improved draft appliance is made in duplicate and used on both sides of the machine, although I need describe its construction and use on one side only.

Coming now more particularly to the present invention, a ring 1 is secured to the outer side of each rear wheel around its hub 2, and upon the ring is permanently secured a disk 3 which is wider than the ring so as to overlap it as shown. In the overlapping portion of this disk is formed a number of circumferential slots 4, each of which has an enlargement or eye 5 at the center of its length. Three such slots are shown in the drawings, and the arrangement just described prevents the accumulation of dirt or mud within them because the ring holds the disk away from the wheel and the slots are open at the rear end as shown. For each wheel I provide a windlass or spool 6 whose bore is of a size to adapt it to be passed over the hub, and the inner flange of this spool has a notch or other device 7 for attaching a rope thereto and a number of headed studs 8 so disposed that they may be passed through the eyes or enlargements of the slots in the disk, after which the spool is turned slightly thereon in either direction to bring the shanks of said studs into one end of the several slots and hold the spool upon the disk.

The numeral 10 designates a rope which may have a knot 11 formed in one end so that it can be detachably engaged with the notch in the spool, after which the rope is given one coil around the latter and led thence forward alongside the automobile to an anchor which may be a stake 12 driven in the roadway some distance in front of the machine as indicated in Fig. 1.

When the autoist becomes stuck in the mud or snow, he has but to attach the two spools to the hubs of his rear wheels, then attach the ropes to the spools and lead them forward, and finally sink the stakes and attach the rope to them; then on starting up the motor the rotation of the rear wheels causes the spools to act as windlasses which wind up on the ropes and draw the machine forward out of the place where it has become stuck and to a position where the tires of its driving wheels will engage the surface of the roadway with sufficient reliability to make the necessity for this invention no longer apparent. The driver then dismounts and detaches the attachment (which can be readily carried in a tool box); and proceeds on his way.

Another feature of my invention whose application and use is also well illustrated in Fig. 1 consists in the provision of friction or tension guides at the extremities of the bumper rod B, through which the ropes are rove between the spools and the anchors. Each device of this character may be a metallic tube 15 with enlarged ends 16, the whole carried on a bracket 17 attached to the bumper rod as shown in Fig. 2, and the smallest diameter of the tube between its extremities being such that it will frictionally engage the rope used so that the latter does not slip therethrough too freely. Or, as shown in Fig. 7, I may employ a pulley 18 whose wheel stands so close to its frame 19 that here also some friction or tension is applied to the rope in its passage therethrough, and this pulley will be connected with the extremity of the bumper rod in the same manner. If desired, the brackets may be made detachable from the bumper rod so that they also can be stored away in the tool box when not in use, and to this end I show the bracket as connected with the bumper rod by means of a bolt 20 as typical of one form of detachable connection between them. I might here add, although the same is not illustrated in the drawings, that if the machine has no pumper rod this friction guide or device could possibly be attached to some other part of the automobile frame near its front end. The use of the draft appliance is the same as above described, but with the addition of this detail the ropes are rove through the friction guides between the spools and anchors. When now the motor is started, each rotating spool acts as a windlass and draws on the rope which is pulled through the friction or tension guide until it becomes taut, and then the automobile is forcibly drawn out of the position in which it was stuck, as described above. As the machine comes out of place, however, it will usually start forward with a bound, and the addition of this feature to my invention prevents it from running onto and over the ropes and tangling them up with the wheels, because the friction devices hold the ropes taut between themselves and the pulleys. Moreover the stiffness of the ropes usually prevents them from winding well onto spools as small as these must be, and the tension devices will therefore serve in the nature of guides and prevent the ropes from being accidentally thrown off the outer ends of the spools.

All parts of this device are by preference of metal excepting the ropes, and while I have shown simple pegs as used as anchors I do not limit myself thereto. Such changes in details may be made as do not depart from the principle of the invention.

What is claimed as new is:

1. In a device of the class described, the combination with a windlass detachably secured to the hub of the rear wheel of an automobile, and a rope connected to the windlass and adapted to be led forward to an anchor in front of the automobile; of a friction guide carried by the forward portion of the automobile and through which said rope is adapted to be drawn.

2. In a device of the class described, the combination with a windlass detachably secured to the hub of an automobile driving wheel, and a rope connected to the windlass and adapted to be led forward to an anchor in the roadway in front of the automobile; of a tension guide carried by the forward portion of the automobile and through which said rope is adapted to be drawn with some degree of friction, the same consisting of a pulley whose wheel is disposed at such a distance from its frame that the rope binds somewhat between them, a bracket by which the pulley-frame is carried, and means for detachably connecting the bracket with the automobile structure.

In testimony whereof I have hereunto set my hand in presence of two subscribing witnesses.

GAY VICTOR DE PEEL.

Witnesses:
GEORGE C. GRIFFIN,
WILLIAM M. ALPIN.

---

Copies of this patent may be obtained for five cents each, by addressing the "Commissioner of Patents, Washington, D. C."